United States Patent [19]
Bouilloux et al.

[11] Patent Number: 6,025,055
[45] Date of Patent: Feb. 15, 2000

[54] FLEXIBLE, POLYAMIDE-BASED COMPOSITIONS SUITABLE FOR EXTRUSION BLOW MOULDING

[75] Inventors: Alain Bouilloux, Bernay; Laurent Teze, Sainte Honorine, both of France

[73] Assignee: Elf Atochem,S.A., France

[21] Appl. No.: 09/027,564

[22] Filed: Feb. 23, 1998

[30] Foreign Application Priority Data

Feb. 26, 1997 [FR] France ................... 97 02304

[51] Int. Cl.$^7$ ............... B32B 23/02; B32B 27/08
[52] U.S. Cl. ............... 428/192; 428/413; 428/474.4; 428/475.5; 428/500; 524/514; 525/179
[58] Field of Search ............... 525/179; 524/514; 428/474.4, 413, 475.5, 500, 192

[56] References Cited

U.S. PATENT DOCUMENTS

| | | | |
|---|---|---|---|
| 4,115,475 | 9/1978 | Foy et al. | 525/425 |
| 4,195,015 | 3/1980 | Deleens et al. | 524/255 |
| 4,230,838 | 10/1980 | Foy et al. | 525/408 |
| 4,331,786 | 5/1982 | Foy et al. | 525/408 |
| 4,332,920 | 6/1982 | Foy et al. | 525/408 |
| 4,839,441 | 6/1989 | Cuzin et al. | 528/328 |
| 4,864,014 | 9/1989 | Cuzin et al. | 528/279 |
| 5,070,145 | 12/1991 | Guerdoux | 525/179 |
| 5,140,065 | 8/1992 | DelleTorre | 525/66 |

FOREIGN PATENT DOCUMENTS

| | | |
|---|---|---|
| 060579 | 9/1982 | European Pat. Off. . |
| 564338 | 10/1993 | European Pat. Off. . |
| 655942 | 5/1986 | Switzerland . |

*Primary Examiner*—Leszek Kiliman
*Attorney, Agent, or Firm*—Bell, Boyd, Lloyd

[57] ABSTRACT

The invention relates to compositions comprising a matrix of an alloy of (a) polyamide and (b) polymer having polyamide blocks and polyether blocks, dispersed in which matrix is a crosslinked phase (c), the said compositions having a melt strength of more than 1.5 and a flexural modulus at 23° C. (in accordance with ISO 178-93) of less than 700 MPa and preferably between 50 and 250 MPa.

Such a composition is useful for manufacturing extrusion blow-moulded parts, especially for cars.

It also relates to articles additionally comprising a part made of polyamide and polyolefin or of a mixture of polyamide and polyolefin.

12 Claims, No Drawings

FLEXIBLE, POLYAMIDE-BASED COMPOSITIONS SUITABLE FOR EXTRUSION BLOW MOULDING

FIELD OF THE INVENTION

The present invention relates to compositions which are based on polyamide and are suitable for extrusion blow moulding. It relates more particularly to flexible compositions comprising a matrix of an alloy of polyamide and polymer having polyamide blocks and polyether blocks, dispersed in which matrix is a crosslinked phase, the said compositions having a melt strength of more than 1.5 and a flexural modulus (at 23° C. in accordance with ISO 178-93) of less than 700 MPa and preferably between 50 and 300 MPa.

BACKGROUND OF THE INVENTION

The melt strength is a measure of the suitability of a polymer or of a polymer mixture for extrusion blow moulding. A measurement is made of the time t2 required for the parison to drop by a height of 25 cm and the time ti required by the parison to drop by a height of 50 cm; the melt strength is the ratio t1/t2. If the polymer or polymer mixture is suitable for the blow moulding of large parts then a ratio close to 2 is found. If it is not close to 2, on the other hand, for example if it is 1.4, this value indicates flow of the parison under its own weight (quickening of the rate of descent) and hence poor suitability for extrusion blow moulding.

DESCRIPTION OF THE INVENTION

THe compositions of the invention are useful for manufacturing flexible, extrusion blow-moulded automotive parts, especially the components situated beneath the bonnet which are required to be resistant to heat. Examples of such components are pipes for the cooling, air-conditioning and combustion air circuits, and various protective sheaths for electrical cables. Many of these parts are currently made of rubber, in other words of vulcanized synthetic or natural elastomers which have to be shaped and then vulcanized in their defined form. Vulcanization is carried out batchwise in ovens or furnaces, and the pipes, for example, are required to contain a mandrel of a substance which resists the vulcanization temperature. The advantage of the compositions of the invention is that, being thermoplastic, all that is required is to extrude them, to shape them by blow moulding and to allow them to cool. Certain ducts, for example the combustion air intake circuits in car engines, consist of rigid or thermoplastic parts and of flexible parts made of rubber, the parts all being joined by hose clamps. The advantage of the compositions of the invention is that it is possible by sequential extrusion blow moulding to extrude, for example, one part in polyamide and then one part in accordance with the compositions of the invention. The two parts become welded end to end under heat. The result is an extrusion blow-moulded part consisting of different materials, one at least of which is a composition according to the invention.

In the case of air intake ducts the result is a duct which can consist of rigid parts and of flexible parts, manufactured as a single part without joins. The present invention additionally relates to such parts.

Another advantage of the compositions of the invention is their resistance to thermal ageing, which is expressed by the half-life. Generally, the parameter used is the change in elongation at break in the course of ageing in a dry oven at 150° C.

The other advantage is the good thermo-mechanical strength: the part must be flexible from room temperature (for assembly of the installation) and yet must not flow under its own weight when the temperature reaches 120, 140 or even 150° C.

The prior art has already described polyamides which are flexible owing either to the incorporation of plasticizer in the polyamide or to mixing with polyolefins. However, in order to obtain low flexural moduli, it is necessary to incorporate large amounts of plasticizer or polyolefins, resulting alternatively in the exudation of plasticizer and thus a loss of flexibility, or in the loss of the polyamide matrix, or mixtures which no longer have mechanical properties or which are difficult to transform.

The prior art has also described mixtures based on polymers comprising polyamide blocks and polyether blocks; however, they are much too elastomeric and no longer have the properties of polyamide.

The water absorption is much lower than in the flexible polyamides of the prior art.

The impact resistance, like the heat resistance, is very good. The materials also feature elastic recovery and a low compression set (CS).

CH 655 941 describes the need to add copolyolefins grafted with maleic anhydride to block polyamide copolymers or to mixtures of these block polyamide copolymers with polyamides, in order to render them flexible. These prior art compositions do not have a polyamide matrix.

U.S. Pat. No. 5,070,145 describes mixtures of polyamide, ethylene-alkyl acrylate copolymers and ethylene-alkyl acrylate-maleic anhydride copolymer.

Although the impact resistance of the polyamides is improved, these compositions do not comprise block polyamide copolymers and do not have the flexibility of the compositions of the invention.

EP 564 338 describes mixtures of polyamide and ethylene-alkyl acrylate-glycidyl methacrylate copolymers and, optionally, ethylene-alkyl acrylate-maleic anhydride copolymer.

The non-polyamide part of these mixtures can therefore be crosslinked, which makes it possible to increase its quantity relative to the polyamide and to lower the flexural modulas. The addition of block polyamide copolymers is not described.

Thus the invention provides compositions comprising a matrix of an alloy of (a) polyamide and (b) polymer having polyamide blocks and polyether blocks, dispersed in which matrix is a crosslinked phase (c), the said compositions having a melt strength of more than 1.5 and a flexural modulus at 23° C. (in accordance with ISO 178-93) of less than 700 MPa and preferably between 50 and 300 MPa.

The term alloy is used to designate the matrix formed from (a) and (b) by virtue of the particularly high compatibility of these polymers.

By polyamide (a) is meant the condensation products:
- of one or more amino acids, such as aminocaproic, 7-aminoheptanoic, 11-aminoundecanoic and 12-aminododecanoic acids or of one or more lactams, such as caprolactam, enantholactam and lauryllactam;
- of one or more salts or mixtures of diamines such as hexamethylenediamine, dodecamethylenediamine, metaxylylenediamine, bis-p-aminocyclohexylmethane and trimethylhexamethylenediamine with diacids such as isophthalic, terephthalic, adipic, azelaic, suberic, sebacic and dodecanedicarboxylic acids;
- or mixtures of some of these monomer which results in copolyamides, for example PA 6/12 bv condensation of caprolactam and lauryllactam.

Polyamide mixtures can be used. Use is made advantageously of PA 6.

The polymers having polyamide blocks and polyether blocks (b) result from the copolycondensation of polyamide sequences having reactive ends with polyether sequences having reactive ends, such as, inter alia:

1) Polyamide sequences having diamine chain ends with polyoxyalkyene sequences having dicarboxylic chain ends.
2) Polyamide sequences having dicarboxylic chain ends with polyoxyalkylene sequences having diamine chain ends obtained by cyanoethylation and hydrogenation of aliphatic alpha,omega-dihydroxylated poloxyalkylene sequences, referred to as polyetherdiols.
3) Polyamide sequences having dicarboxylic chain ends with polyetherdiols, the products obtained being, in this particular case, polyetheresteramides.

The polyamide sequences having dicarboxylic chain ends originate, for example, from the condensation of alpha, omega-aminocarboxylic acids and lactams or of carboxylic diacids and diamines in the presence of a carboxylic diacide chain-limiting agent. Advantageously, the polyamide blocks are of polyamide 12 or polyamide 6.

The number-average molar mass of the polyamide sequences is between 300 and 15,000 and preferably between 600 and 5000. The mass of the polyether sequences is between 100 and 6000 and preferably between 200 and 3000.

The polymers having polyamide blocks and polyether blocks may also include randomly distributed units. These polymers can be prepared by the simultaneous reaction of the polyether and of the precursors of the polyamide blocks.

For example, the polyetherdiol, a lactam (or an alpha-omega amino acid) and a chain-limiting diacid can be reacted in the presence of a small amount of water. A polymer is obtained which has essentially polyether blocks and polyamide blocks which are highly variable in length, but where the various reactants have also reacted randomly and are distributed statistically along the polymer chain. These polymers having polyamide blocks and polyether blocks, whether originating from the copolycondensation of polyamide and polyether sequences prepared beforehand or from a single-stage reaction, possess, for example, Shore D hardnesses which can be between 20 and 75 and advantageously between 30 and 70, and an intrinsic viscosity of between 0.8 and 2.5, measured meta-cresole at 25° C.

Where the polyether blocks derive from polyethylene glycol, from polyoxypropylene glycol or from polyoxytetramethylene glycol, either they are used as they are and subjected to copolycondensation with polyamide blocks having carboxyl ends, or they are aminated to convert them to polyetherdiamines and are subjected to condensation with polyamide blocks having carboxyl ends. They can also be mixed with polyamide precursors and a chain-limiting agent in order to produce polymers having polyamide blocks and polyether blocks, having units distributed statistically.

Polymers having polyamide and polyether blocks are described in the patents U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920.

The polyether can be, for example, a polyethylene glycol (PEG), a polypropylene glycol (PPG) or a polytetramethylene glycol (PTMG). The latter is also referred to as polytetrahydrofuran (PTHF).

Where the polyether blocks are introduced into the chain of the polymer having polyamide blocks and polyether blocks in the form of diols or of diamines, they are referred to for simplicity as PEG blocks or PPG blocks or else PTMG blocks.

It would not be departing from the scope of the invention if the polyether blocks were to contain different units, such as derived from ethylene glycol, from propylene glycol or else from tetramethylene glycol.

Preferably, the polyamide blocks comprise the same units as the polyamide (a).

Preferably, the polymer having polyamide blocks and polyether blocks comprises a single type of polyamide block and a single type of polyether block. Use is made advantageously of polymers having PA 6 blocks and PTMG blocks and polymers having PA 12 blocks and PTMG blocks.

It is also possible to use a mixture of two polymers having polyamide blocks and polyether blocks.

Advantageously, the polymer having polyamide blocks and polyether blocks is such that the polyamide is the major constituent by weight, in other words such that the quantity of polyamide which is in the form of blocks and that which is, if appropriate, distributed statistically within the chain represents 50% by weight or more of the polymer having polyamide blocks and polyether blocks. Advantageously, the quantity of polyamide and the quantity of polyether are in a ratio (polyamide/polyether) of from 50/50 to 80/20.

Preferably, the polyamide blocks and the polyether blocks of a single polymer (b) have masses Mn of 1000/1000, 1300/650, 2000/1000, 2600/650 and 4000/1000, respectively.

The crosslinked phase (c) is the product of reaction of a functionalized polymer (C1) with an at least difunctional product (C2) in the presence if desired of a catalyst.

The compositions of the invention are prepared in the melt state in extruders or mixers in accordance with the techniques customary for thermoplastics. They are available in the form of granules. It is then sufficient to melt these granules in, for example, an extruder which feeds an extrusion blow moulding device. It is also possible to prepare the compositions of the invention directly by charging the various constituents (a), (b) and the precursors of (c) to an extruder which feeds the extrusion blow moulding device.

In the latter case, the extruder must be suitable for the conditions of mixing and reacting the precursors of the crosslinked phase (c).

It is therefore clear that the compositions of the invention are thermoplastic.

The functionalized polymer (C1) can be a polymer with epoxy, carboxyl or carboxylic anhydride functions and the difunctional product (C2) can be a product having two carboxyl functions or one carboxylic anhydride function and one epoxide function, or two carboxylic anhydride functions or two epoxide functions.

It would not be departing from the scope of the invention if (C2) were to be patly esterified, provided that there remained sufficient functions to form a crosslinked phase (c).

According to a first embodiment of the invention, (C1) is either a copolymer of ethylene and an unsaturated epoxide or a polyolefin grafted with an unsaturated epoxide and (C2) is either a copolymer of ethylene and an unsaturated carboxylic acid or unsaturated carboxylic anhydride, or a polyolefin grafted with an unsaturated carboxylic acid or unsaturated carboxylic anhydride.

According to a second embodiment of the invention, (C1) is, as before, either a copolymer of ethylene and an unsaturated epoxide or a polyolefin grafted with an unsaturated epoxide and (C2) is a dicarboxylic acid, a polycarboxylic acid or a partial or total anhydride of these acids.

According to a third embodiment of the invention, (C1) is either a copolymer of ethylene and an unsaturated carboxylic acid or an unsaturated carboxylic anhydride, or a polyolefin grafted with an unsaturated carboxylic acid or an unsaturated carboxylic anhydride, and (C2) is a product having two epoxide functions, such as, for example, the diglycidyl ether of bisphenol A (BADGE).

As far as the polyolefin grafted with an unsaturated epoxide is concerned, polyolefin means the polymers comprising olefin units such as, for example, ethylene, propylene or 1-butene units, or any other alpha-olefin. By way of example, mention may be made of polyethylenes such as LDPE, HDPE, LLDPE or VLDPE, polypropylene, ethylene-propylene copolymers, EPRs (ethylene-propylene rubbers) or else metallocene PEs, styrene-ethylene/butene-styrene (SEBS) block copolymers, styrene-butadiene-styrene (SBS) block copolymers, styrene-isoprene-styrene (SIS) block copolymers, styrene-ethylene/propylene-styrene block copolymers, and ethylene-propylene-diene (EPDM) copolymers;

copolymers of ethylene with at least one product chosen from the salts or the esters of unsaturated carboxylic acids, or the vinyl esters of saturated carboxylic acids.

Advantageously, the polyolefin (C) to be grafted with an unsaturated epoxide is chosen from LLDPE, VLDPE, polypropylene, ethylene-vinyl acetate copolymers or ethylene-alkyl (meth)acrylate copolymers. The density can be advantageously between 0.86 and 0.965 and the melt flow index (MFI) can be between 0.3 and 40.

As far as the copolymers of ethylene and an unsaturated epoxide are concerned, mention may be made, for example, of copolymers of ethylene with an alkyl (meth)acrylate and an unsaturated epoxide, or the copolymers of ethylene, a vinyl ester of a saturated carboxylic acid and an unsaturated epoxide. The quantity of epoxide can be up to 15% by weight of the copolymer and the quantity of ethylene at least 50% by weight.

Advantageously, (C1) is a copolymer of ethylene with an alkyl (meth)acrylate and an unsaturated epoxide.

Preferably, the alkyl (meth)acrylate is such that the alkyl possesses from 2 to 10 carbon atoms.

As far as the first embodiment of the invention is concerned, (C2) can be a polyolefin grafted with an unsaturated carboxylic acid or an unsaturated carboxylic anhydride, and the polyolefin can be chosen from the abovementioned polyolefins, which must be grafted with an unsaturated epoxide to form (C1). (C2) can also be a copolymer of ethylene and an unsaturated carboxylic acid or an unsaturated carboxylic anhydride.

By way of example mention may be made of copolymers of ethylene, alkyl (meth)acrylate and an unsaturated carboxylic acid or anhydride, and copolymers of ethylene, a vinyl ester of a saturated carboxylic acid, and an unsaturated carboxylic acid or anhydride.

The quantity of unsaturated carboxylic acid or anhydride can be up to 15% by weight of the weight.

Advantageously, (C2) is a copolymer of ethylene, an alkyl (meth)acrylate and an unsaturated carboxylic anhydride. Preferably, the alkyl (meth)acrylate is such that the alkyl possesses from 2 to 10 carbon atoms.

Examples of alkyl acrylates and methacrylates which can be used as constituents of (C1) and (C2) are, in particular, methyl methacrylate, ethyl acrylate, n-butyl acrylate, isobutyl acrylate and 2-ethylhexyl acrylate. Examples of unsaturated epoxides which can be used as constituents of (C1) are, in particular:

aliphatic glycidyl ethers and esters, such as allyl glycidyl ether, vinyl glycidyl ether, glycidyl maleate and itaconate, glycidyl acrylate and methacrylate, and alicyclic glycidyl ethers and esters, such as 2-cyclohexen-1-yl glycidyl ether, diglycidyl 4,5-cyclohexenedicarboxylate, glycidyl 4-cyclohexenecarboxylate, glycidyl 2-(2-methyl-5-norbornene)-carboxylate and diglycidyl endocisbicyclo[2.2.1]-5-heptene-2,3-dicarboxylate.

Examples of unsaturated dicarboxylic anhydrides which can be used as constituents of (C2) are, in particular, maleic anhydride, itaconic anhydride, citraconic anhydride and tetrahydrophthalic anhydride.

According to this first embodiment of the invention it is recommended that a catalyst be added, i.e. a product capable of accelerating the reaction between the epoxy function present in (C1) and the acid or anhydride function present in (C2).

Within the scope of the present invention it is advantageous for the catalyst to be in sufficient quantity to fulfil effectively its role of promoting the at least partial crosslinking of the composition (C). Determining the effective quantity of catalyst is in the ability of the skilled worker once the proportions of epoxide in (C1) and of acid or anhydride evident in (C2) have been fixed. Catalysts are particularly useful for the reaction between epoxy and anhydrides.

Among the compounds capable of accelerating the reaction between the epoxy function present in (C1) and the anhydride or acid function present in (C2) mention may be made, in particular, of:

tertiary amines, such as dimethyllaurylamine, dimethylstearylamine, N-butylmorpholine, N,N-dimethylcyclohexylamine, benzyldimethylamine, pyridine, 4-dimethylaminopyridine, 1-methylimidazole, tetramethylethylhydrazine, N,N-dimethylpiperazine, N,N,N',N'-tetramethyl-1,6-hexanediamine, and a mixture of tertiary amines having from 16 to 18 carbons which is known by the name of dimethyltallowamine;

1,1-diazabicyclo[2,2,2]octane (DABCO);

tertiary phosphines, such as triphenylphosphine;

zinc alkyldithiocarbamates;

alpha, omega-amino carboxylic acids such as for example $NH_2$—$(CH_2)_5$COOH, $NH_2$—$(CH_2)_{10}$—COOH and $NH_2$—$(CH_2)_{11}$—COOH; aminoundecanoic acid is preferred.

The amount used is advantageously 0.1 to 3, preferably 0.5 to 1.5 weight percent of (C1)–(C2).

The applicant, without being bound by this explanation, believes that the amino acids transform anhydrides of (C2) partly to acids which are very reactive with epoxy.

In this first embodiment of the invention the melt index (or flow index, or MI or MFI) of (C1) and (C2) can be, for example, between 0.3 and 20 at 190° C./2.16 kg.

As far as the second embodiment of the invention is concerned, (C2) can be chosen from aliphatic, alicyclic or aromatic polycarboxylic acids and their partial or total anhydrides.

By way of examples of aliphatic acids mention may be made of succinic, glutaric, pimelic, azelaic, sebacic, adipic, dodecanedicarboxylic, octadecanedicarboxylic, dodecenesuccinic and butanetetracarboxylic acids.

By way of examples of alicyclic acids mention may be made of cyclopentanedicarboxylic, cyclopentanetricarboxylic, cyclopentanetetracarboxylic, cyclohaxanedicarboxylic, cyclohexanetricarboxylic, methylcyclopentanedicarboxylic, tetrahydrophthalic, endomethylenetetrahydrophthalic and methylendomethylenetetrahydrophthalic acids.

By way of examples of aromatic acids mention may be made of phthalic, isophthalic, terephthalic, trimellitic, trimesic and pyromellitic acids.

By way of examples of anhydrides mention may be made of the partial or total anhydrides of the above acids.

Advantageously, adipic acid is used.

In this second embodiment of the invention, the melt index of (C1) can be between 0.3 and 20 at 190° C./2.16 kg.

As far as the third embodiment of the invention is concerned, (C1) is the polymer (C2) of the first embodiment of the invention and is advantageously a copolymer of ethylene, an alkyl (meth)acrylate and an unsaturated carboxylic anhydride.

The proportion of (C1) and (C2) required to form the crosslinked phase (C) is determined in accordance with the usual rules of the art by the number of reactive functions present in (C1) and in (C2).

For example, the proportion of (C2) is such that the number of acid functions is from 0.5 to 1.5 per epoxide function. If (C2) contains anhydride functions, its proportion is such that there are from 0.5 to 1.5 anhydride functions per epoxide function.

For example, as far as the first embodiment of the invention is concerned, if (C1) is a copolymer of ethylene, an alkyl (meth)acrylate and an unsaturated epoxide and (C2) is a copolymer of ethylene, an alkyl (meth)acrylate and an unsaturated carboxylic anhydride, the proportions are such that the ratio between the anhydride functions and the epoxy functions is in the region of 1.

As far as the second embodiment of the invention is concerned, if (C1) is a copolymer of ethylene, an alkyl (meth)acrylate and an unsaturated epoxide and (C2) is a dicarboxylic acid, the proportions are such that there is one acid function per epoxide function.

Advantageously the polymer (C2) of the first embodiment of the invention and the polymer (C1) of the third embodiment of the invention have anhydride functions partly hydrolyzed or are a mixture of a polymer with acid functions and of a polymer with anhydride functions.

It would not be departing from the scope of the invention if the phase (C) contained a non-crosslinked polyolefin. This polyolefin can be chosen from the abovementioned polyolefins.

The proportions of the various constituents (a), (b) and (c) are such that a+b+c=100. (a) and (b) are indiscernible and form the matrix, i.e. (a+b)/(a+b+c)>0.45 and preferably 0.5≦(a+b)/(a+b+c)≦0.65.

The flexural modulus increases when (c) decreases.

The proportions of (b) in (a)+(b) make it possible to vary the flexural modulus: the greater the proportion of (b) the lower the flexural modulus (the other values being constant).

(b)/(a+b) can be between 0.1 and 0.9 and preferably from 0.3 to 0.75.

Compositions which are particularly useful are those having a flexural modulus (at 23° C., ISO 178-93) of between 100 and 300 MPa.

The melt strength is advantageously greater than 1.6 and preferably between 1.7 and 2. The melt strength is determined at the chosen extrusion temperature for the compositions. This temperature is commonly between 225 and 245° C.

The resistance to thermal ageing is determined by measuring the elongation at break of tensile specimens which have spent variable periods in a dry oven under air at 150° C. The form of the test specimens (ISO R 527-B) and the measured elongation at break correspond to the application of the standard ISO R 527:93 for a traction rate of 50 mm/minute. The procedure followed is as follows:

injection moulding of the test specimens followed by drying at 60° C. under vacuum for 48 hours.

the test specimens required for the determination of the initial elongation at break are conditioned for two days/23° C./50% RH before traction.

the test specimens required for the ageing study are placed in a dry oven at 150° C. under air directly after drying.

specimens to be tested are removed at predetermined ageing times and are conditioned (48 hours/23° C./50% RH) prior to measurement of the elongation at break.

the elongation obtained is given relative to the initial elongation of a test specimen which has not undergone ageing at 150° C., in order to give the relative elongation at break as a function of the period of ageing.

Advantageous compositions are such that (a) is PA 6, (b) is a copolymer having PA 6 blocks and PTMG blocks, and (c) is the crosslinking of a copolymer (C1) of ethylene, an alkyl (meth)acrylate and glycidyl (meth)acrylate with a copolymer (C2) of ethylene, an alkyl (meth)acrylate and maleic anhydride. Preferably a part of (C2) is replaced by a copolymer ethylene/(meth)acrylic acid or ethylene/alkyl-(meth)acrylate/(meth)acrylic acid.

Among these compositions preference is given to those having a melt strength of between 1.7 and 2. Preference is also given to those having a flexural modulus of between 50 and 250 MPa.

These compositions of the invention may also comprise fillers, flame retardants, glidants or anti-blocking agents, antioxidants and anti-UV agents.

The present invention also relates to extrusion blow-moulded articles comprising at least one part (1) consisting of the flexible compositions of the invention and at least one other part (2) essentially consisting alternatively of polyamide or of polyolefin or of a mixture of polyamide and polyolefin and being different from the compositions of part (1), parts (1) and (2) being welded to one another (by melting) at their contact surface.

EXAMPLES

The products used are designated as follows:

Amino 11: aminoundecanoic acid.

PA 1=polyamide 6 with an MFI of between 17 and 20 (at 235° C./2.16 kg).

PA 2=polyamide 6 with an MFI of between 1.5 and 3 (at 235° C./2.16 kg).

PEBAX 1: copolymer with PA 6 blocks of Mn 1300 and PTMG blocks of Mn 650, having a Shore D hardness of 56 and an intrinsic viscosity of 1.38 measured in meta-cresole at 25° C. for an initial concentration of 0.8 g/100 ml.

VLDPE:=linear low-density polyethylene (d=0.900) with an MFI of 0.8 (measured at 190° C./2.16 kg).

Lotader 1: ethylene-butyl acrylate-maleic anhydride copolymer with a composition by weight of 79.2/17.7/3.1 and an MFI of 4.5 (measured at 190° C./2.16 kg).

Lotader 2: ethylene-ethyl acrylate-maleic anhydride copolymer with a composition by weight of 70.9/27.6/1.5 and an MFI of 7 (measured at 190° C./2.16 kg).

Lotader 3: ethylene-methyl acrylate-glycidyl methacrylate copolymer with a composition by weight of 64.2/28/7.8 and an MFI of 7 (measured at 190° C./2.16 kg)

ANTI 51 denotes IRGANOX 1098 from CIBA.

ANTI 82 denotes HOSTANOX PAR 24 from HOECHST.

EXL 3611=acrylic core-shell additive having on its surface reactive groups with PA 6 and Pebax.

XX1275 denotes a crosslinking accelerator of the dimethyltallowamine (DMT) type as a master batch (MM) in Lotader 2.

LUCALENE 3110=ethylene-butylacrylate-acrylic acid with a composition by weight of 88/8/4 (BASF).

XX1325 denotes a master batch (MM) of DABCO in Lotader 2 (80/20).

MM black denotes a master batch of carbon black in VLDPE.

The Examples of Table 1 attached illustrate what can be done and obtained in accordance with the invention. Comparative Example 1 constitutes the reference base as far as the melt strength and resistance to thermal ageing are concerned, although its flexural modulus is still too high for the applications envisaged. The examples provided are carried out on a Werner 40 extruder.

Comparative Example 1: Reference example for the production of flexible formulations by combining solely PA 6 and crosslinked polyolefin phase (two Lotaders reacting with one another). The polyolefin phase, which represents 50% by weight of the total formulation, consists of an ethylene-ethyl acrylate-maleic anhydride terpolymer, an ethylene-methyl acrylate-glycidyl methacrylate terpolymer and a catalyst (DMT) for the reaction between maleic anhydride and glycidyl methacrylate (the latter is in the form of granules of DMT masterbatch MB in Lotader 2). The four types of granules (Lotader 2+Lotader 3+MB+PA 6) are introduced in dry-blend form or via four independent metering units into the hopper of a Werner & Pfleiderer corotating twin-screw extruder with a diameter of 40 mm, L/D=40 (9 barrels+4 spacers, giving an overall length of 10 barrels). The throughput of the extruder is 50 kg/hour and the speed of screw rotation is 150 rpm. The melt temperatures at the entrance of barrels 4, 6 and 8 and at the head are respectively 260° C., 230° C., 235° C. and 255° C. The extruded rods are granulated and then treated in an oven under vacuum for 8 hours at 80° C. and are finally packaged in airtight sacks.

Then bars measuring 80×10×4 mm are injection moulded for measuring the flexural modulus at 23° C. (in accordance with standard ISO 178-93) after conditioning for 14 days at 50% relative humidity and 23° C. The modulus measured for this Comparative Example 1 is 400 MPa.

The resistance to thermal ageing of this Comparative Example 1 is good. The half-life of this sample (defined as being the time after which the above ratio is 0.5) as being 360 hours (Table 1, Comparative Example 1).

The suitability for extrusion blow moulding results from the implementation of a true extrusion test on an extrusion blow moulding machine of the type SERTA ESH 2 fitted with a PE screw of a diameter of 50 mm and an L/D=24. This is a single-screw extruder which continuously feeds an extrusion head fitted with divergent parison-stick/die tooling with respective diameters of 52 and 50 mm. For a display profile of barrel and head temperatures of 210° C./220° C./230° C./235° C./235° C. (which corresponds to a melt temperature of 237° C. in this case) and a screw speed of 30 rpm, the time is measured for the parison to drop by a height of 25 cm (t2 in Table 1) and by a height of 50 am (t1 in Table 1). The melt strength is defined as being the ratio t1/t2. If the suitability for the blow moulding of large parts is good, a ratio close to 2 will be found. On the other hand, if it is not close to 2 (for example 1.4), this value indicates flow of the parison under its own weight (quickening of the rate of descent) and poor suitability for extrusion blow moulding. For this Comparative Example 1, the melt strength is 1.65 (at 237° C.), which is considered as good suitability for extrusion blow moulding.

Comparative Example 2 : This comparative example illustrates formulations of PA 6+Pebax+polyolefin+ functional polyolefin. The procedure is as in Comparative Example 1 but with the following changes: part of the PA 6 is replaced by Pebax, the mixture of Lotader reagents is replaced by a single mixture of low-density polyethylene and Lotader. The polyamide 6, Pebax, very low-density polyethylene and Lotader are introduced into the extruder via four independent weigh feeders (or by simple dry premixing of the various granules). The throughput of the extruder is 50 kg/hour and the speed of screw rotation is 150 rpm. The melt temperatures within barrels 4, 6 and 8 and at the head are 250° C., 240° C., 245° C. and 240° C., respectively. The extruded rods are granulated and then treated in an oven under vacuum for 8 hours at 80° C.

This Comparative Example 2 features a low flexural modulus (206 MPa), which is desirable. However, its half-life at 150° C. is limited (140 hours) and, moreover, the melt strength (measured as for Comparative Example 1 but at 225° C.) is 1.3 (an unsuitable material for the blow moulding of large parts).

Comparative Example 3: As Comparative Example 2. with all conditions otherwise equal, the quantities of Pebax, PA 6 and VLDPE are lowered by 1% so as to permit the introduction into the composition of 3% by weight of EXL 3611 (acrylic core-shell additive having on its surface groups which are reactive towards PA 6 and Pebax). The introduction of this additive makes it possible to increase, by reaction on the matrix, the melt viscosity at a low shear gradient. The melt strength is improved (1.36 at 230° C. for Comparative Example 3 as against 1.3 at 225° C. for Comparative Example 2) but remains inadequate for the extrusion of large parts. Otherwise, the flexural modulus and thermal ageing are equivalent to Comparative Example 2.

Comparative Examples 4, 5 and 6 and Examples 1 to 4: For the examples and comparative examples which follow, the same compounding extruder as before is used but with some modifications in the operating parameters. These parameters are summarized in the table below. In addition, for these tests, the granules obtained are treated in an oven at 70° C. for 16 hours under vacuum before their bagging and subsequent use.

| Examples | Comp. Ex. 4 | Comp. Ex. 5 | Comp. Ex. 6 | Ex. 1 | Ex. 2 | Ex. 3 | Ex. 4 |
| --- | --- | --- | --- | --- | --- | --- | --- |
| Melt temp. B4 | 235 | 230 | 230 | 230 | 220 | 225 | 220 |
| Melt temp. B6 | 255 | 245 | 245 | 245 | 240 | 250 | 245 |
| Melt temp. B8 | 250 | 250 | 250 | 250 | 245 | 250 | 250 |
| Melt temp. head | 265 | 260 | 260 | 260 | 260 | 255 | 260 |
| Screw speed | 200 | 200 | 200 | 200 | 200 | 200 | 200 |
| Throughput in kg/h | 50 | 50 | 50 | 50 | 50 | 50 | 50 |

(Melt temp. B4 = Melt temperature at the entrance of barrel 4)

Comparative Example 4: As Comparative Example 3. 2% by weight of EXL 3611 (acrylic core-shell additive having reactive groups on its surface) is introduced into the composition, and the PA 6 of Comparative Example 1, 2 and 3 is replaced by a more viscous PA 6.

The melt strength is measured on the same Serta machine as for Comparative Examples 1, 2 and 3 but with divergent punch/die tooling with diameters of 15 and 20 mm respectively, a display profile of barrel and head temperatures of 230° C./240° C./255° C./250° C./245° C. (corresponding to a melt temperature of 240° C.) and a screw speed of 30 rpm. The melt strength is substantially improved (1.36 at 230° C. for Comparative Example 3 as against 1.4 at 240° C. for Comparative Example 4) but still remains inadequate for the extrusion of large parts.

Comparative Example 5: All conditions otherwise being equal, as Comparative Example 4 except that the 32% by weight of low-density polyethylene and the 8% of Lotader 1 are replaced by 40% by weight of Lotader 1. EXL 3611 (acrylic core-shell additive having reactive groups on its surface) is, moreover, kept in the formulation. The melt strength is measured on the same Serta machine and under the same conditions as for Comparative Example 4 (divergent punch/die tooling with diameters of 15 and 20 mm respectively, a display profile of barrel and head temperatures of 230° C./240° C./255° C./250° C./245° C. (corresponding to a melt temperature of 240° C.) and a screw speed of 30 rpm). The melt strength is substantially improved (1.45 at 240° C. for Comparative Example 5 as against 1.4 at 240° C. for Comparative Example 4) but still remains inadequate for the extrusion of large parts.

Comparative Example 6: All conditions otherwise being equal, as Comparative Example 5 except that the respective amounts of PA 6 and Pebax change from 25 and 35% by weight respectively to 40% and 20% by weight. EXL 3611 (acrylic core-shell additive having reactive groups on its surface) is, moreover, kept in the formulation. The melt strength is measured on the same Serta machine and under the same conditions as for Comparative Example 5. The melt strength is substantially improved (1.5 at 240° C. for Comparative Example 6 as against 1.45 at 240° C. for Comparative Example 5) but still remains inadequate for the extrusion of large parts.

Example 1: In this first example allowing the invention to be illustrated, a matrix consisting of PA 6+Pebax (Comparative Examples 2 to 6) is combined with a crosslinked polyolefin phase consisting of the mixture of Lotader reactants as described in Comparative Example 1. Flexural modulus (in this case 197 MPa) and melt strength (in this case 1.94) were determined under the same conditions as for Comparative Examples 4, 5 and 6. Relative to the Comparative Examples, this Example 1 combines flexibility with high suitability for extrusion blow moulding.

Examples 2 to 4: Identical to Example 1 except that the amount of polyolefin (50% by weight for 5 Examples 2 and 4, 40% by weight for Example 3) and/or the ratio PA 6/Pebax (see Table 1) are varied. The products resulting from these examples are at the same time flexible (flexural modulus<200 MPa) suitable for extrusion blow moulding (melt strength>1.8) and resistant to thermal ageing (half-life>400 hours) for Examples 3 and 4 in particular.

Below it is demonstrated that the formulas according to the invention have a better thermo-mechanical strength. This is measured by a measurement as a function of temperature (between −140° C. and +240° C.) of the dynamic elastic modulus E' (conditions: tensile stress at a dynamic frequency of 10 rad/sec on an apparatus of type RSA2, after conditioning of the test specimens beforehand for 14 days/23° C./50% RH).

| Examples | Comp. Ex. 2 | Comp. Ex. 6 | Example 1 |
|---|---|---|---|
| Modulus at 20° C. (Pa) | 2.9 E8 | 2.2 E8 | 2.4 E8 |
| Modulus at 120° C. (Pa) | 6.4 E7 | 2.2 E7 | 7.4 E7 |
| Ratio E20° C./E120° C. | 4.5 | 10 | 3.2 |

The ratio of the modulus at 20° C. over the modulus at 120° C. makes it possible to demonstrate a smaller change in the case of Example 1 (ratio=3.2), despite equivalent flexibilities at room temperature which are close to 200 Mpa.

Examples A to H

The throughput of the extruder is 50 kg/hour.

Results are summarized on table 2; Amounts are by weight. (MEB) Microscopy: "Inverted matrix" means a polyethylene matrix (Lotader), "co continous" means a PA-Pebax matrix in which is dispersed a continous crosslinked phase.

Flexural modulus (dry conditions) is measured at 23° C. At 23° C. after conditioning for 14 days at 50% relative humidity and 23° C. Flexural modulus of examples D, E and F are lowered from 485 to 200, from 466 to 198 and from 487 to 242 MPa.

MFi (235° C. 5 kg) has been measured on crude products (without drying), % of water is shown.

Aspect of bellows : Bellows (corrugated tubes) have been made by blow molding.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE 1

|  |  | Comp. Ex. 1 | Comp. Ex. 2 | Comp. Ex. 3 | Comp. Ex. 4 | Comp. Ex. 5 |
|---|---|---|---|---|---|---|
| PA 1 = Polyamide PA 6 |  | 50 | 25 | 24 |  |  |
| PA 2 = Polyamide PA 6 |  |  |  |  | 25 | 25 |
| PEBAX 1 |  |  | 35 | 34 | 35 | 35 |
| VLDPE |  |  | 32 | 31 | 32 |  |
| Lotader 1 |  |  | 8 | 8 | 8 | 40 |
| Paraloid EXL 3611 |  |  |  | 3 | 2 | 2 |
| Total (Lot. 2 + Lot. 3 + XX1275 (75/22/31)) |  | 50 |  |  |  |  |
|  | Anti 51 | 1 | 1 | 1 | 1 | 1 |
|  | Anti 82 | 0.4 | 0.4 | 0.4 | 0.4 | 0.4 |
| MFI (235° C./2.16 kg) after 1 night/80° C./vacuum |  |  | 4.3 | 2.5 | 2.6 | 2.4 |
| MFI (235° C./5 kg) after 1 night/80° C./vacuum |  | 2 – 1.7 |  |  | 9.1 | 10.4 |
| MFI (235° C./10 kg) after 1 night/80° C./vacuum |  | 6.2 |  |  |  |  |

TABLE 1-continued

|  |  |  |  |  |  |  |
|---|---|---|---|---|---|---|
| Melt strength (with associated melt temp.) |  | 1.65 (237° C.) | 1.3 (225° C.) | 1.36 (230° C.) | 1.4 (240° C.) | 1.45 (240° C.) |
|  | t1 (50 cm) | 15.3 | 29.8 | 35 | 23 | 23.7 |
|  | t2 (25 cm) | 9.3 | 22.9 | 25.6 | 16.4 | 16.3 |
| Flexural modulus at 23° C. (ISO 178-93) in MPa |  | 400 | 206 | 200 | 176 | 205 |
| ISO 868 hardness at 23° C. (instantaneous Shore D) |  |  | 57.7 | 57.5 | 59.2 | 60.8 |
| ISO 868 hardness at 23° C. (Shore D at 5 seconds) |  | 56 | 52.4 | 51 | 53.4 | 55.2 |
| ISO 868 at 23° C. (Shore D at 15 seconds) |  | 55 | 51.3 | 50 | 51.8 | 53.4 |
| Dry oven ageing under air at 150° C. |  |  |  |  |  |  |
| Elongation at break (relative to initial elongation) |  |  |  |  |  |  |
|  | 0 hour | 1.00 | 1.00 | 1.00 |  |  |
|  | 24 h |  | 0.70 | 1.06 |  |  |
|  | 46 h |  |  |  |  |  |
|  | 48 h |  | 0.72 | 0.68 |  |  |
|  | 90 h |  | 0.77 | 0.64 |  |  |
|  | 95 h |  |  |  |  |  |
|  | 174 h | 0.71 |  |  |  |  |
|  | 190 h |  | 0.20 | 0.28 |  |  |
|  | 261 h |  |  |  |  |  |
|  | 483 h |  |  |  |  |  |
|  | 500 h | 0.37 |  |  |  |  |
|  | 816 h |  |  |  |  |  |
|  | 1000 h | 0.05 |  |  |  |  |
| Half-life at 150° C. (L/Lo = 0.50) |  | 360 h | 140 h | 140 h |  |  |

|  |  | Comp. Ex. 6 | Example 1 | Example 2 | Example 3 | Example 4 |
|---|---|---|---|---|---|---|
| PA 1 = Polyamide PA 6 |  |  |  |  |  |  |
| PA 2 = Polyamide PA 6 |  | 40 | 40 | 33 | 25 | 21 |
| PEBAX 1 |  | 20 | 20 | 17 | 35 | 29 |
| VLDPE |  |  |  |  |  |  |
| Lotader 1 |  | 40 |  |  |  |  |
| Paraloid EXL 3611 |  | 2 |  |  |  |  |
| Total (Lot. 2 + Lot. 3 + XX1275 (75/22/3)) |  |  | 40 | 50 | 40 | 50 |
|  | Anti 51 | 1 | 1 | 1 | 1 | 1 |
|  | Anti 82 | 0.4 | 0.4 | 0.4 | 0.4 | 0.4 |
| MFI (235° C./2.16 kg) after 1 night/80° C./vacuum |  | 1.8 |  |  |  |  |
| MFI (235° C./5 kg) after 1 night/80° C./vacuum |  | 8.4 |  |  |  |  |
| MFI (235° C./10 kg) after 1 night/80° C./vacuum |  |  | 3.2 | 1.1 | 4.4 | 2.3 |
| Melt strength (with associated melt temp.) |  | 1.5 (240° C.) | 1.94 (240° C.) | 1.9 (240° C.) | 1.83 (240° C.) | 1.95 (240° C.) |
|  | t1 (50 cm) | 20.9 | 15 | 13.6 | 13.2 | 14.8 |
|  | t2 (25 cm) | 14 | 7.8 | 7.1 | 7.2 | 7.6 |
| Flexural strength at 23° C. (ISO 178-93) in MPa |  | 211 | 197 | 129 | 137 | 105 |
| ISO 868 hardness at 23° C. (instantneous Shore D) |  | 61.2 | 61.4 | 59.4 | 60.2 | 56.2 |
| ISO 868 hardness at 23° C. (Shore D at 5 seconds) |  | 55.6 | 55.6 | 51 | 51 | 47.4 |
| ISO 868 hardness at 23° C. (Shore D at 15 seconds) |  | 54.6 | 54.6 | 49.6 | 49.6 | 45.2 |
| Dry oven ageing under air at 150° C. |  |  |  |  |  |  |
| Elongation at break (relative to initial elongation) |  |  |  |  |  |  |
|  | 0 hour |  |  | 1.00 | 1.00 | 1.00 |
|  | 24 h |  |  |  |  |  |
|  | 46 h |  |  | 0.73 | 0.84 | 0.80 |
|  | 48 h |  |  |  |  |  |
|  | 90 h |  |  |  |  |  |
|  | 95 h |  |  | 0.63 | 0.77 | 0.68 |
|  | 174 h |  |  |  |  |  |
|  | 190 h |  |  |  |  |  |
|  | 261 h |  |  | 0.48 | 0.60 | 0.69 |
|  | 483 h |  |  | 0.29 | 0.43 | 0.46 |
|  | 500 h |  |  |  |  |  |
|  | 816 h |  |  | 0.13 | 0.21 | 0.34 |
|  | 1000 h |  |  |  |  |  |
| Half-life at 150° C. (L/Lo = 0.50) |  |  | 230 h | 400 h | 440 h |  |

TABLE 2

| Examples | H | A | B | C | D | E | F | G |
|---|---|---|---|---|---|---|---|---|
| PA 2 | 39 | 39 | 39 | 39 | 39 | 39 | 39 | 39 |
| Pebax 1 | 19.57 | 19.57 | 19.57 | 19.57 | 19.57 | 19.57 | 19.57 | 19.57 |
| Lotader 2 | 29.27 | 30.2 | 30 | 30.05 | 30 | 20.22 |  | 20.22 |
| Lotader 3 | 8.59 | 8.43 | 8.53 | 8.78 | 8.63 | 8.7 | 8.7 | 8.4 |
| xx1275 (MM with DMT) | 1.17 |  |  |  |  |  |  |  |
| xx1325 (MM with DABCO) |  | 0.4 | 0.5 |  |  |  |  | 0.3 |
| Amino 11 |  |  | 0.2 | 0.4 |  |  |  |  |
| Lucalene 3110 |  |  |  |  |  | 10.11 | 30.33 | 10.11 |

TABLE 2-continued

| Examples | H | A | B | C | D | E | F | G |
|---|---|---|---|---|---|---|---|---|
| MM black | 1 | 1 | 1 | 1 | 1 | 1 | 1 | 1 |
| Anti 51 | 1 | 1 | 1 | 1 | 1 | 1 | 1 | 1 |
| Anti 82 | 0.4 | 0.4 | 0.4 | 0.4 | 0.4 | 0.4 | 0.4 | 0.4 |
|  |  | 1% dabco | 1.28% dabco | 0.5% a11 | 1% a11 | 1/3 lucalène without catalyst | 100% lucalène without catalyst | 1/3 lucalène with catalyst |
| Microscopy (MEB) | Inverted matrix | co continuous | co continuous | co continuous | co continuous | co continuous | co continuous | co continuous |
| Flexural modulus MPa |  |  |  |  | 485 | 466 | 487 |  |
| MFI 235° C. Kg crude product | 0.4 | 0.8 | 1 | 1.8 | 1 | 0.6 | 0.5 | 0.5 |
| water (weight %) | 0.41 | 0.41 | 0.2 | 0.27 | 0.31 | 0.38 | 0.45 | 0.15 |
| Melt temperature B4 | 256 | 262 | 269 | 273 | 272 | 272 | 277 | 269 |
| Aspect of bellows |  | good | good | good | good | excellent | good | excellent |
| Melt Strength | 1.8 | 1.8 | 1.78 | 1.7 | 1.8 | 1.87 | 1.84 | 1.9 |

We claim:

1. Compositions comprising a matrix of an alloy of (a) polyamide and (b) polymer having polyamide blocks and polyether blocks, dispersed in the matrix is a crosslinked phase (c), the compositions having a melt strength of greater than 1.5 and a flexural modulus at 23° C., in accordance with ISO 1798-93, of less than 700 MPa.

2. Compositions according to claim 1, wherein (c) is the product of reaction to a functionalized polymer (C1) which (C1) is either a copolymer of ethylene and an unsaturated epoxide or a polyolefin grafted with an unsaturated epoxide with an at least difunctional product (C2) which is either a copolymer of ethylene and an unsaturated carboxylic acid or anhydride or a polyolefin grafted with an unsaturated carboxylic acid or an unsaturated carboxylic anhydride.

3. Compositions according to claim 2, wherein (C1) is either a copolymer of ethylene and an unsaturated epoxide or a polyolefin grafted with an unsaturated epoxide and (C2) is a dicarboxylic acid, a polycarboxylic acid or a partial or total anhydride of these acids.

4. Compositions according to claim 1, wherein the weight proportions of the constituents are a+b+c=100–(a+b)/(a+b+c)>0.45.

5. Compositions according to claim 1, wherein the weight proportions of the constituents are 0.1 ≦b/(a+b), ≦0.9.

6. Compositions according to claim 1, wherein the melt strength is between 1.7 and 2.

7. Compositions according to claim 1, wherein the flexural modulus, at 23° C. in accordance with ISO 178-93, is between 100 and 300 MPa.

8. Compositions according to claim 1, wherein:

(a) is PA 6

(b) is a copolymer having PA 6 blocks and PTMG blocks (c) is a crosslinking of a copolymer (C1) of ethylene, an alkyl (meth)acrylate and glycidyl (meth)acrylate with a copolymer (C2) of ethylene, an alkyl (meth)acrylate and maleic anhydride, and the melt strength is between 1.7 and 2.

9. Extrusion blow-moulded articles comprising at least one part (1) consisting of compositions of claim 1 and at least one other part (2) being a polyamide, a polyolefin or a mixture of polyamide and polyolefin and being different from the compositions of part (1), the parts (1) and (2) being welded to one another at their contact surface.

10. Compositions according to claim 1, wherein the flexural modulus is between 50 and 300 MPa.

11. Compositions according to claim 4, wherein the proportions of constituents is 0.5≦(a+b)/(a+b+c)≦0.65.

12. Compositions according to claim 5, wherein the proportion of constituents is 0.3≦b/(a+b)≦0.75.

* * * * *